United States Patent

[11] 3,593,168

[72] Inventor Criley Orton
  Arlington, Calif.
[21] Appl. No. 576,780
[22] Filed Aug. 31, 1966
[45] Patented July 13, 1971
[73] Assignee The United States of America as represented by the Secretary of the Navy

[54] VIDEO PULSE NORMALIZER
  7 Claims, 3 Drawing Figs.
[52] U.S. Cl. ................................................. 328/168,
  307/264, 307/268
[51] Int. Cl. ..................................................... H03k 5/08
[50] Field of Search........................................ 307/88.5-
  7.1, 10.30, 230, 264, 268; 328/53, 54, 168

[56] References Cited
UNITED STATES PATENTS
2,507,145 5/1950 Dean ........................... 328/168

*Primary Examiner*—Malcolm F. Hubler
*Attorneys*—G. J. Rubens, J. M. St. Amand and T. M. Phillips

ABSTRACT: A circuit for normalizing over a wide video input range, the first pulse of a chain of pulses whose relative amplitude ratios contain information. The video input pulses are applied to a resistance divider and the output is taken from a junction within the divider. The second, or lower resistor resistance value is changed in inverse ratio to the amplitude of the first video pulse so that the output amplitude of the first pulse remains constant.

CRILEY ORTON
INVENTOR.

BY

ATTORNEYS

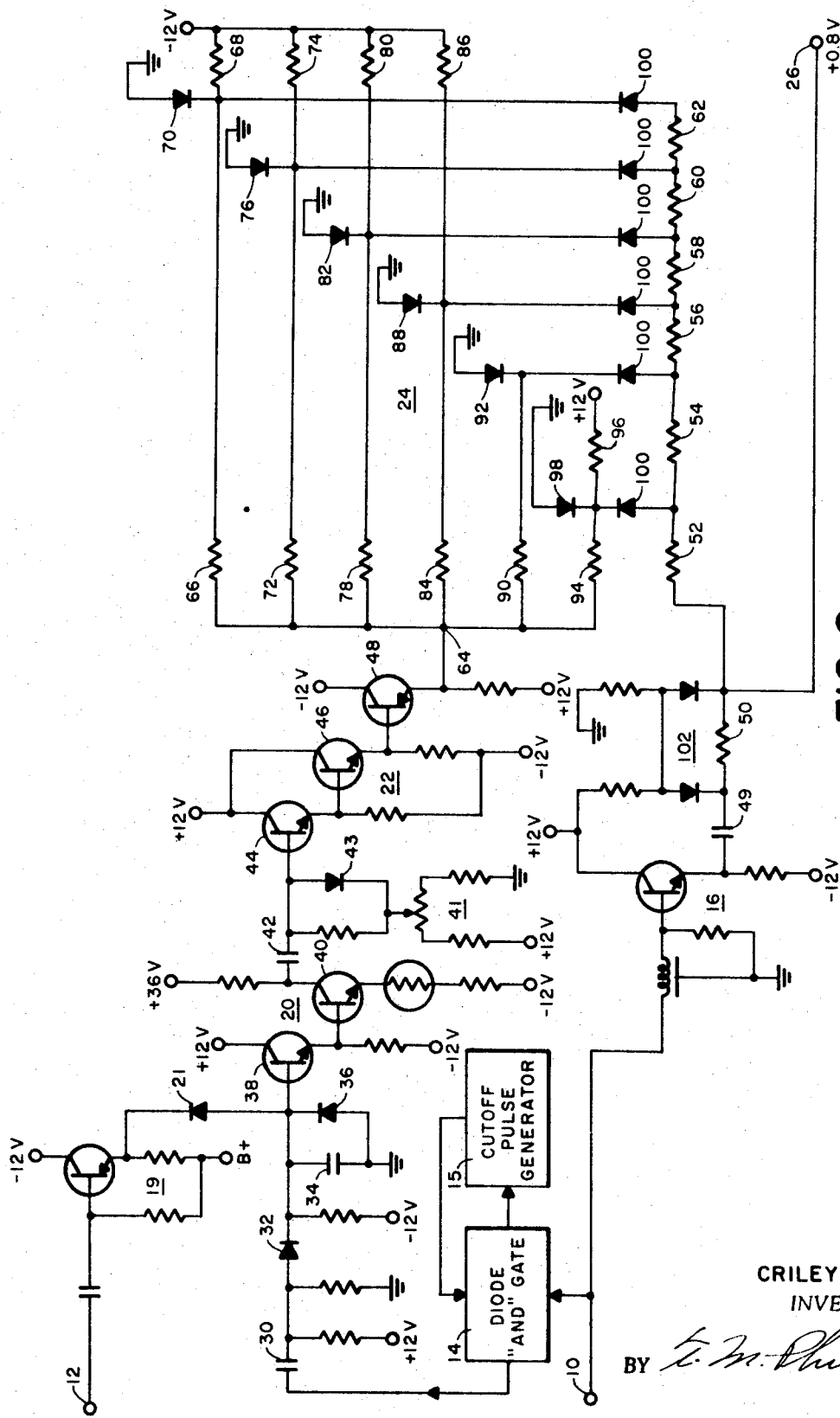

VIDEO PULSE NORMALIZER

The invention herein described may be manufactured and used by or for the Government of the United States of America for governmental purposes without the payment of any royalties thereon or therefor.

The present invention relates to a pulse normalizer and more particularly to a video pulse normalizer for use in radar receivers.

Where discrete output voltages for discrete angles of target off an antenna boresight are required for autopilot systems, difficulty has been experienced in using automatic gain control techniques for maintaining the first pulse of the video pulse train closer than ±10 db. around a nominal value. The function of a normalizer is to normalize the first pulse of a two-pulse train without changing the input ratio of second to first pulse, which represents a discrete angle. Thus the ratio is caused to represent a discrete output voltage difference between pulses for a discrete angle even though the input amplitudes may be varying. This voltage difference represents the amount of guidance error which is fed to the autopilot computer.

Several circuits have been employed in the past, called analog video dividers, to perform video pulse normalization or a constant ratio between a first pulse of a pulse train and the succeeding pulses. One technique was to boxcar the pulses of the pulse train and to modulate a carrier with the second pulse. The first boxcar pulse controlled a variable gain vacuum tube amplifier, after which the signal was detected and filtered, providing directional information. Dividing occurred almost continuously. Another technique of the divider type that required up to 150 $\mu$sec. dividing time for each pulse train used vacuum tubes as did the first. The second divider used boxcars derived from the pulse train and required up to 100-volt boxcar amplitudes for accuracy of the divided output. The most common defect of the prior known circuits is the relative slow mode of operation.

In describing the present invention which provides video pulse normalization, a two-pulse video train is used as an example. It is to be understood that pulse trains of two or more can be normalized. In the example chosen, the first pulse amplitude may be any value from 1 to 10 volts and is the reference for the second pulse. The amplitude of the second pulse may be the same amplitude as the first pulse or may be different. The pulse train is applied to an "AND" gate which is normally open. The leading edge of the first pulse triggers a cutoff pulse generator which closes the "AND" gate for the rest of the first pulse and the duration of the second pulse. The portion of the first pulse permitted to pass is fed to a boxcar circuit which provides an output called the gain control voltage, that is held long enough for the pulse train to be normalized. The gain control voltage is fed to an inverter and transformed and coupled through a low impedance network to a shaping network. The original pulse train is also fed through a 1 $\mu$sec. delay circuit to the shaping network where the amplitudes of the pulse train are adjusted to provide the proper difference of the pulse amplitudes. The shaping network is equivalent to a two resistance volt divider network in which the input resistor is fixed and the second resistor is variable. The second resistor consist of a series of resistors which are successively shorted to ground as the gain control voltage increases, thereby decreasing the total value of the resistance and decreasing the percentage of voltage passed. As the gain control voltage is fed through the shaping network, the first pulse of the output is maintained at about 0.8 volts for an input variation from 1 to 10 volts. For an input ratio of 1.25:1, the input difference between the two pulses varies from 0.2 volts (at 1 and 0.8 volts for the 2 pulses respectively) to 2 volts (at 10 and 8 volts for the two pulses) whereas the output has only one value of 0.16 volts, (difference between 0.8 and 0.64 volts for the two output pulses). The output signal from the shaping network can be amplified to any desired working level.

Accordingly an object of the invention is to provide a video pulse normalizer which normalizes the first pulse of a train of video pulses whose ratio conveys information of the angular position of a radar target.

Another object of the present invention is to provide a video pulse normalize which is much faster than prior known normalize circuits by completing the dividing functions in 1 $\mu$sec. or more of the prior known circuits.

Other objects and many of the attendant advantages of this invention will become readily appreciated as the same becomes better understood by reference to the following detailed description when considered in connection with the accompanying drawings wherein:

FIG. 2 is a schematic diagram of the embodiment of FIG. 1.

Figure 1:
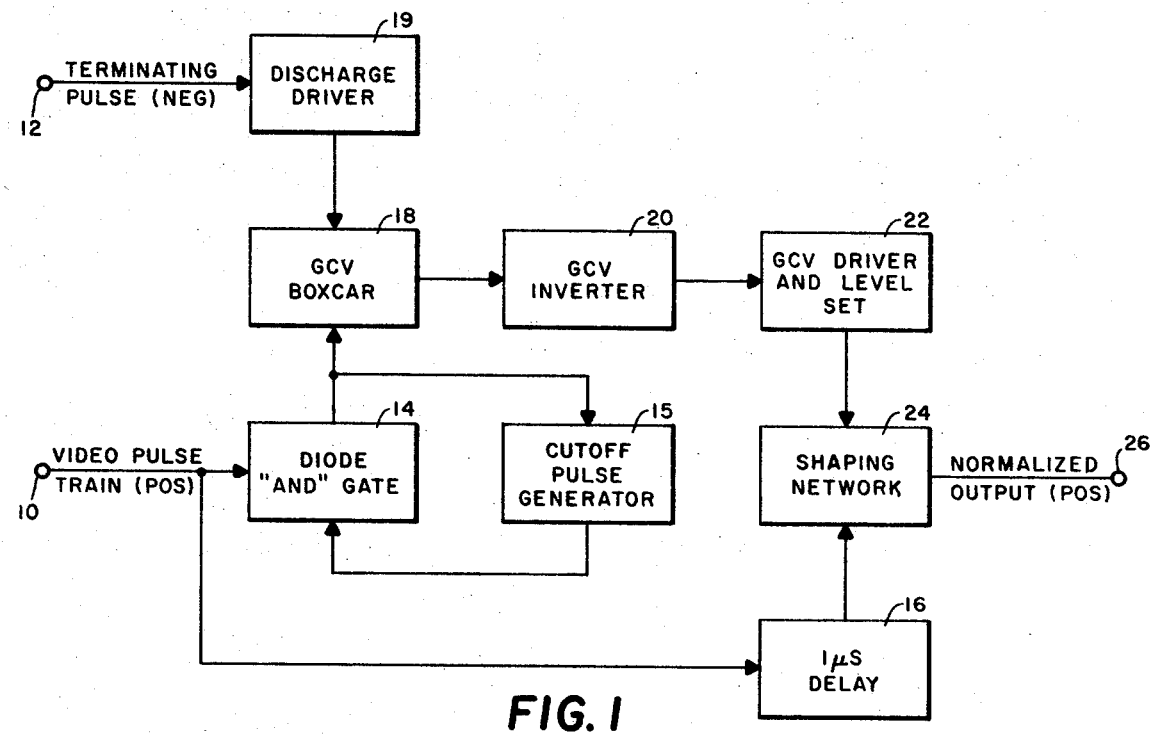
FIG. 1 is a block diagram of a preferred embodiment of the invention.
Figure 3:
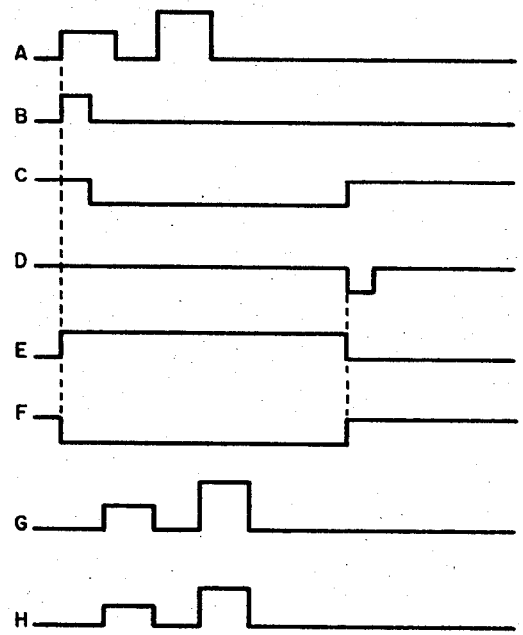
FIG. 3 is a graph of waveforms used in the explanation of the operation of the invention.

Referring now to the drawings there is shown in FIG. 1 an input terminal 10 for receiving the train of video pulses (waveform A, FIG. 3) to be normalized. The pulse train is fed to a normally open "AND" gate 14 which passes the pulse train to cutoff pulse generator 15 and boxcar circuit 18. The leading edge of the first pulse (waveform B, FIG. 3) passed by gate 14 triggers pulse generator 15 to generate a pulse (waveform C, FIG. 3) that is fed back to gate 14 which blocks the remainder of the first pulse and the succeeding pulse from passing. The portion of the first pulse passed by gate 14 is fed to boxcar circuit 18 where it is stored or stretched (waveform E, FIG. 3) and becomes the gain control voltage. The gain control voltage is inverted by means of inverter circuit 20 and coupled through a low impedance or driver and level set circuit 22 (waveform F, FIG. 3) to shaping network 24. The video pulse train at terminal 10 is also coupled to shaping network 24 through a 1 $\mu$sec. delay circuit 16 (waveform G, FIG. 3) where the first pulse is adjusted to a constant amplitude while maintaining the proper ratio of the two pulses and appears at output terminal 26 (waveform H).

The duration of the gain control voltage at boxcar circuit 18 should be for the duration of the pulse train and is terminated by terminating pulse (waveform D) from terminal 12 coupled through driver circuit 19 to discharge the stored signal. Cutoff pulse generator 15 may be a one-shot multivibrator while "AND" gate 14 may be a standard computer gate using diodes.

Referring now to the schematic diagram of FIG. 2, the output pulse from gate 14 is coupled through capacitor 30 and diode 32 to storage capacitor 34 which is shunted by a diode 36. The charge will remain stored on capacitor 34 until a terminating pulse is received at terminal 12 and is coupled through driver circuit 19 and discharge diode 21 to capacitor 34. Diode 36 clamps the lower discharge limit to ground level. The voltage across capacitor 34 is coupled through a high impedance transistor 38 to transistor 40 where the signal is inverted and coupled through coupling capacitor 42 to an emitter follower chain consisting of transistors 44, 46, and 48 to provide a low level impedance match for shaping network 24.

Shaping network 24 is essentially a two resistance voltage divider network in which input resistor 50 is fixed and the second resistor consists of a plurality of series connected resistors 52, 54, 56, 58, 60, and 62 which can be successively shorted to ground as the gain control voltage at junction 64 increases. By means of resistors 66 and 68, diode 70 is biased to conduct at the lowest voltage and short out resistor 62. In a similar manner, resistors 72 and 74 provide bias for diode 76 which shorts out resistor 60; resistors 78 and 80 provide bias for diode 82 which shorts out resistor 58; resistors 84 and 86 provide bias for diode 88 which shorts out resistor 56; resistor 90 provides bias for diode 92 which shorts out resistor 54; and resistor 94 and 96 provide bias for diode 98 which shorts out resistor 52. Diodes 100 are blocking diodes to prevent shorting of the series of resistors except when the gain control voltage shorts diodes 70, 76, 82, 88, 92, and 98. The delayed pulse train is coupled from the delay circuit 16 through coupling capacitor 49 to input resistor 50. A clamping circuit 102 provides the proper DC level for the base line of the video pulse train so that both the input and output pulses will have the same base line value. As the total value of the resistance of the series connected resistors decrease, the percentage of voltage passed is decreased.

With no input signal and using the above example, all of diodes 100 are nonconducting and the voltage at the emitter of transistor 48, point 64, is approximately +4.5 volts. This level is held closely over a −55° to +85° centigrade temperature range because the base-to-emitter changes of transistors 44 and 46 are cancelled by the opposite polarity changes across diode 43 and transistor 48. The proper operating level for shaping network 24 is controlled by means of potentiometer 41.

Obviously many modifications and variations of the present invention are possible in the light of the above teachings. It is therefore to be understood that within the scope of the appended claims the invention may be practiced otherwise than as specifically described.

What I claim is:

1. In a pulse normalizer circuit for use in a target tracking system, the combination comprising:
   a. a normally open gate circuit having a first input adapted to receive a train of video pulses, a second input and an output,
   b. a pulse generator having an input coupled to the output of said normally open gate circuit and an output coupled to the second input of said normally open gate circuit, said pulse generator being responsive to the leading edge of the first pulse passed by said normally open gate circuit for generating an output pulse that is fed to and closes said normally open gate circuit for a predetermined time interval,
   c. a boxcar circuit coupled to the output of said normally open gate circuit for producing an output voltage proportional to the amplitude of the first pulse passed by said gate circuit having a constant amplitude and of a time duration equivalent to the time duration of the train of pulses being normalized,
   d. a wave-shaping network having first and second inputs and an output,
   e. driver circuit means coupling the output of said boxcar circuit to the first input of said wave-shaping network,
   f. delay circuit means coupling said video pulse train to the second input of said wave-shaping network,
   g. said wave-shaping network being responsive to the voltage from said boxcar circuit for modifying the input video pulse train having pulse amplitudes of a constant ratio.

2. The normalizer circuit of claim 1 wherein said wave-shaping network comprises an input fixed resistance and variable stepped output resistance connected in series.

3. The normalizer circuit of claim 2 wherein said variable stepped output resistance comprises a plurality of series connected resistors, each of said resistors having a voltage responsive shorting circuit connected between said resistor and ground.

4. The normalizer circuit of claim 3 wherein said voltage responsive shorting circuit is a diode.

5. The normalizer circuit of claim 4 wherein the output of said boxcar circuit is coupled to said diodes and the video pulse train is coupled to said input resistance.

6. The normalizer circuit of claim 1 wherein said delay circuit means provides a delay of said video pulse train for 1 microsecond.

7. The normalizer circuit of claim 1 wherein said driver circuit means includes an emitter cascade circuit with the voltage reversed on one stage.